United States Patent [19]

Blood

[11] Patent Number: 4,849,692
[45] Date of Patent: Jul. 18, 1989

[54] DEVICE FOR QUANTITATIVELY MEASURING THE RELATIVE POSITION AND ORIENTATION OF TWO BODIES IN THE PRESENCE OF METALS UTILIZING DIRECT CURRENT MAGNETIC FIELDS

[75] Inventor: Ernest B. Blood, Burlington, Vt.

[73] Assignee: Ascension Technology Corporation, Burlington, Vt.

[21] Appl. No.: 917,389

[22] Filed: Oct. 9, 1986

[51] Int. Cl.$^4$ .......................... G01B 7/14; G01S 5/04
[52] U.S. Cl. ..................................... 324/208; 342/451
[58] Field of Search ................ 324/207, 208; 342/450, 342/451, 452, 453; 340/870.31

[56] References Cited

U.S. PATENT DOCUMENTS

| | | |
|---|---|---|
| 3,027,951 | 4/1962 | Knapp et al. ........................ 324/207 |
| 4,197,855 | 4/1980 | Lewin . |
| 4,303,077 | 12/1981 | Lewin et al. . |
| 4,396,885 | 8/1983 | Constant ............................. 324/208 |
| 4,622,644 | 11/1986 | Hansen . |

OTHER PUBLICATIONS

"Determination of Depth of Shallowly Buried Objects by Electromagnetic Induction", by Das, et al., *IEEE Transactions on Geoscience and Remote Sensing*, vol. GE-23, No. 1, Jan. 1985.

*Primary Examiner*—Reinhard J. Eisenzopf
*Assistant Examiner*—Walter E. Snow
*Attorney, Agent, or Firm*—Anthony G. M. Davis; Michael J. Bujold; John J. Welch, Jr.

[57] ABSTRACT

A device for quantitatively measuring the relative position and orientation of two bodies in the presence of metals via measuring the position and orientation of receiving antennae with respect to transmitting antennae utilizing direct current electromagnetic field signals is hereby disclosed. The transmitting and receiving components of the instant device consist of two or more separate transmitting antennae of known position and orientation with respect to each other. Each transmitting antenna is driven one at a time by a pulsed, direct current signal. The receiving antennae measure the values of transmitted direct current magnetic fields one dimension at a time and those of the Earth's magnetic field as well, one dimension at a time. A computer is used to control circuit elements of the transmitting and receiving elements of the device and likewise functions to convert received signals into position and orientation outputs after having first effected a subtraction out of the overall value of the Earth'magnetic field.

11 Claims, 4 Drawing Sheets

COMPUTATION AND CONTROL TASKS

FIG. 6

DEVICE FOR QUANTITATIVELY MEASURING THE RELATIVE POSITION AND ORIENTATION OF TWO BODIES IN THE PRESENCE OF METALS UTILIZING DIRECT CURRENT MAGNETIC FIELDS

BACKGROUND OF THE INVENTION

1. Field Of The Invention:

This invention pertains to devices utilized for purposes of measuring the position and orientation of receiving antennae with respect to transmitting antennae using direct current signals.

2. Description Of the Prior Art:

The art of using transmitting and receiving components with electromagnetic coupling for measuring position and orientation is well known especially with respect to armament sighting systems where the receiver component would be located in a gunner's helmet and a transmitter component would be attached to a nearby electrically non-conductive structure. As the gunner would sight-in a target through a sighting cross-hair affixed to his helmet, the receiver located thereupon would pick up signals generated by the transmitter. These signals would then be processed by a computer to determine the position and orientation of the helmet and then to contemporaneously point a unit of armament in the same direction as the helmet mounted sight piece.

As taught in U.S. Pat. No. 4,054,881 issued Feb. 18th, 1977 to Raab and U.S. Pat. No. 4,287,809 issued Sept. 8th, 1981 to Egli et al., and U.S. Pat. No. 4,314,251 issued Feb. 2nd, 1982 to Raab and U.S. Pat. No. 4,396,885 issued Aug. 2nd, 1983 to Constant, an alternating current (AC) signal is applied in a time division or frequency division format to a transmitter consisting of two or three orthogonal coils which generate an AC electromagnetic field which is measured by an AC receiver likewise consisting of three or two orthogonal coils. These sensed signals are then filtered and amplified in a method compatible with the transmitted format, converted to a digital format and then read into a computer where various mathematical methods are resorted to in order to extract position and orientation with resort to applicable electromagnetic field equations.

All current systems such as the ones abovesaid that utilize an AC transmitted signal work accurately only when there are no electrically conductive materials located near either the transmitter or receiver because any transmitted AC signal would invariably induce eddy currents in these conductive materials which would in turn serve to generate an AC magnetic field that would distort any transmitted field, and, of course, any ultimate output position and orientation data. In fighter aircraft or helicopters where it is desired to use these position and orientation measuring systems, there are a lot of highly conductive materials in the form of aluminum, titanium, magnesium, stainless steel, and copper used in the construction of the cockpit structure, seat, wiring and helmet-mounted displays. U.S. Pat. No. 4,287,809 teaches a method of compensating for the errors resulting from any field distortion due to cockpit metal that does not move with respect to the transmitter. The compensation method therein suggested involves making measurements throughout the cockpit to determine the amount of such distortion and then using this data to form a correction that is applied to the sensed signals. In a similar manner, U.S. Pat. No. 4,394,831 issued July 26th, 1983 to Egli et al. teaches a method to accomplish compensation for errors due to eddy currents induced in metal such as would be found in a display located on a pilot's helmet. This compensation method again requires initial experimental measurements of such distortion in order to effect necessary corrections and provides moderate improvements in accuracy only when the amount of metal on the helmet is concentrated in a single location and the helmet does not go through large angular rotations or translations in the cockpit. These types of compensation efforts that are required to make AC systems work accurately are time consuming and expensive to perform and only work in environments where there would not be too much conductive material near transmitter or receiver units. In many helicopters, for example, AC systems cannot be utilized at all because the distortions produced are simply too large to be corrected merely by such mapping.

The instant device represents a radical departure from all of the prior art relating to such transmitting and receiving position and orientation devices, insomuch as it avoids, in-toto, resort to AC signals and instead relies upon DC signals. Such reliance on DC signals obviates completely any need for a priori calibration undertakings and greatly expands the potential utility of devices of this type. Moreover, manufacture and utilization of this device for purposes of accomplishing all that current devices can accomplish is manifestly less expensive than such manufacture and utilization of said currently used devices are or ever will be.

SUMMARY OF THE INVENTION

This device consists of a two- or three-axis transmitter driven by a pulsed DC current coupled with a three- or two-axis receiver that is sensitive to a transmitted DC magnetic field emanating from the abovesaid activated transmitter. Moreover, there are receiver signal processing electronics that control the receiver and serve to convert its output to a format suitable for processing by a digital computer in conjunction with a method for processing received signals so as to thereby develop position and orientation data.

An object of this invention is to provide a system of transmitting and receiving antennae that by themselves intrinsically and with inherent electronic means together with a digital computer readily measure position and orientation relative to one another without the need for expensive calibration procedures undertaken in advance of implementation and further without concern for what types of diamagnetic or paramagnetic metallic materials such as may be nearby. For the first time, for instance, devices of this nature could be used in helicopters.

Another object of this invention would be to provide a computer graphics system with an effective three-dimensional "mouse" where presently only two-dimensional "mouse" devices are known to exist. For instance, no longer will a graphics processor need to use one hand to control a "mouse" for length and width drafting on a computer screen and another hand to turn knobs to achieve image depth on such a screen. With this device, one hand can control all three dimensions on such a screen with respect to the drafting of images including image rotation as well, while the other hand would be free to perform other design tasks such as recording, drafting, et cetera.

Still another object of this invention is to provide a distinctly less expensive sighting device than is currently provided within the framework of the present state of the art separate and apart from the cost savings to be realized from abrogation of calibration requirements. Presently, the cores of the transmitting components of these devices are made up of Ferrite. Ferrite is rather expensive, but, in addition to this, it is also rather fragile and difficult to shape. However, Ferrite is necessary as a core piece in order to keep eddy current distortion acceptably low where AC current is used. But, there are no AC signal components in the instant device's steady state signal and hence, the same magnetic flux concentration as can be had with Ferrite can likewise be had and used with this device by resorting to less expensive iron or steel for a transmitting core piece, since, with this device, there is no need to be concerned with eddy currents at all.

A DETAILED DESCRIPTION OF THE PREFERRED EMBODIMENTS

Figure 1:
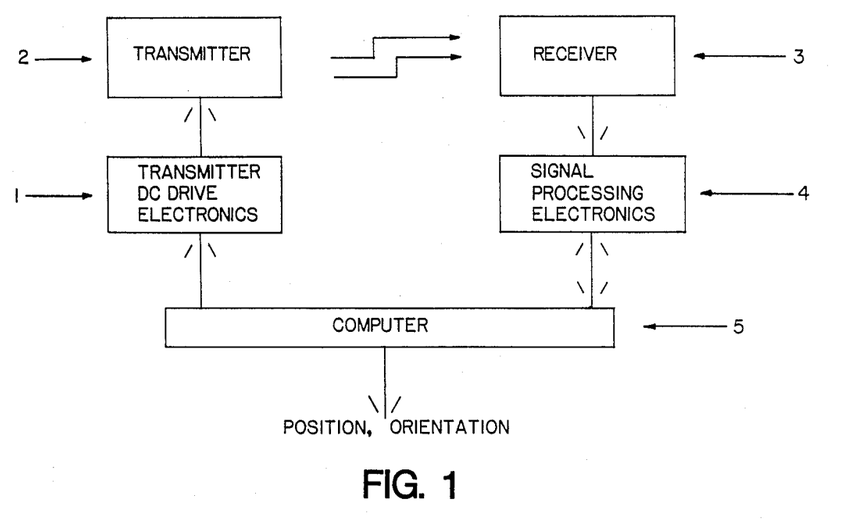
FIG. 1 is a block diagram of the disclosed invention.

FIG. 1 depicts the major elements of the disclosed invention. The electromagnetic position and orientation measuring system consists of: a Transmitter Driver Circuit 1 for providing a controlled amount of DC current to each of two or three axes of Transmitter 2 one at a time. The amount of DC current provided by Driver 1 to the Transmitter axis to which it is provided is controlled by Computer 5. Transmitter 2 is usually attached to the cockpit structure of an aircraft or helicopter and would be located within a few feet of distance from a pilot's head in its military application, or in its computer graphics application, Transmitter 2 would be located on, under, or above any table where a computer graphics user would be working. Transmitter 2 consists of two or three individual antennae arranged concentrically which generate a multiplicity of DC magnetic fields that are picked up by Receiver 3. Receiver 3 measures not only the fields generated by Transmitter 2 but also the earth's magnetic field to therby effect an ultimate measure of the position and orientation of the object to which it is attached. In the military application, this is usually the pilot's helmet. In the computer graphics application, Receiver 3 is usually hand-held. Receiver 3 consists of three or two axes with driving and detecting circuits that are sensitive to DC magnetic fields. The D.C. signal output from Receiver 3 goes to the Signal Processing Electronics 4. Signal Processing Electronics 4 controls, conditions, and converts analog receiver signals into a digital format that can be read by Computer 5. Computer 5, by way of an algorithm, such as the one detailed in FIG. 6 below, computes the position and orientation of Receiver 3 with respect to Transmitter 2. Computer 5 then outputs this information to an aircraft's armament control computer or in the computer graphics application, to a graphic image controller.

Figure 2:
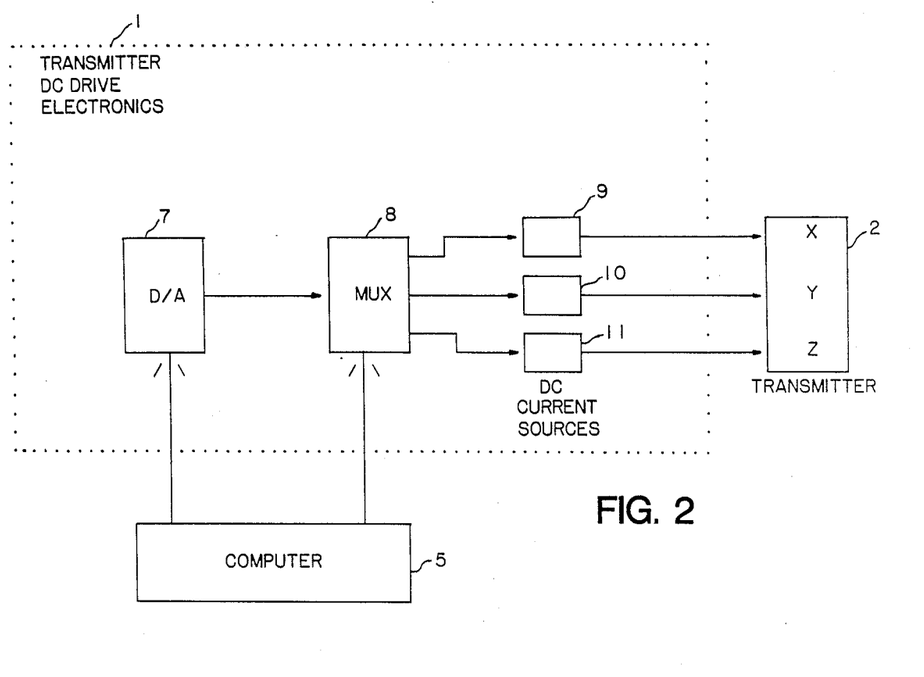
FIG. 2 is a block diagram of the transmitter driver electronics, which constitute an integral part of the disclosed invention.

FIG. 2 presents the details of the Transmitter Drive Electronics 1. The purpose of the Transmitter Drive Electronics 1 is to provide DC current pulses to each antennae of Transmitter 2, one antenna at a time. While a given Transmitter 2 antenna is being provided with current, readings are taken from the antennae of Receiver 3. For a Transmitter 2 composed of three antennae (X, Y, and Z axis antennae) and a Receiver 3 also composed of three antennae (X, Y, and Z axis antenna), there would be nine readings of the transmitted signal. Transmitter 2 is initially shut off and Receiver 3 measures the X, Y, and Z components of the Earth's magnetic field. In respect of the operation of the Transmitter DC Drive Electronics, Computer 5 sends to the Digital to Analog (D/A) Converter 7 a digital number that represents the amplitude of the current pulses to be sent to the selected transmitter antenna. The D/A Converter 7 converts this digital representation of the amplitude to an analog control voltage. This control voltage goes to the Multiplexer (MUX) 8 which connects or switches the control voltage to one of the Current Sources 9, 10, or 11 as directed by Computer 5 when it is desired to transmit on the X, Y or Z transmitter axis. Current Sources, 9, 10, and 11 are identical. Their purpose is to provide a DC current to the Transmitter 2's antennae one at a time. The amplitude of such current so provided is proportional to the input control voltage generated by the D/A 7. Construction details for said DC current sources are not presented here because they are well known to one skilled in the art.

Figure 3:
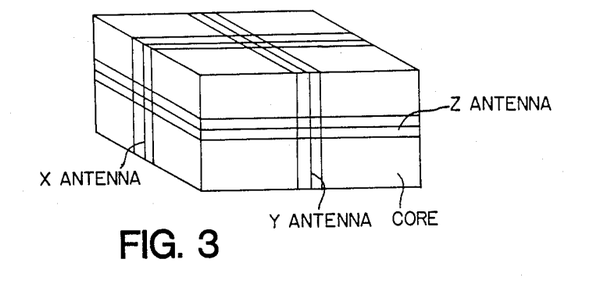
FIG. 3 shows the construction of the transmitter component of the instant invention.

Transmitter 2 as shown in FIG. 3 consists of a core about which X, Y and/or Z antennae are wound. The core can be constructed of air, but is usually constructed of magnetically permeable ferrite that concentrates the magnetic flux at any given location around the antenna. Ferrite is an expensive material, very fragile and difficult to shape but must be used in the cores of systems that use an AC signal format because its eddy current losses are very low. For Transmitter 2 herein disclosed there are no AC signal components in its steady state signal and the core can therefore be and has been constructed of very inexpensive iron or steel and obtain the same flux concentration as the more expensive ferrite. The antenna windings of Transmitter 2 consist of multiple turns of standard magnetic wire. The size of the wire, the number of turns, and the enclosed area of the antenna winding, are determined by methods well known to those skilled in the art of designing antennae. Transmitter 2 generates a near field signal strength variation of the order of $1/R^3$ (R equalling the distance between Transmitter 2 and Receiver 3 at any one instant in time.

Receiver 3 consists of three or two antennae arranged approximately orthogonal to each other with driving and detecting circuits. Each antenna is capable of measuring a DC magnetic field. There are many technologies available for use as a DC Receiver 3. A representative embodiment of Receiver 3 would be the three axis toroidal fluxgate magnetometer detailed in U.S. Pat. No. 3,800,213 issued Mar. 26, 1974 to Rorden. Other representative embodiments would be DC field sensitive technologies that may also be used for Receiver 3: including thin film magnetometers as detailed in U.S. Pat. No. 3,942,258 issued Mar. 9, 1976 to Stucki et al. or zero magnetostrictive amorphous ribbon magnetometers as detailed in "Magnetometers Using Two Amorphous Core Multivibrator Bridge" by K. Mohri et al. in IEEE Transactions on Magnetics, Vol. MAG-19, No. 5, Sep. 1983, or Hall effect based DC sensors as detailed in "Low Field Hall Effect Magnetometry" by P. Daniil and E. Cohen in J. Appl. Phys. 53(11), November 1982; or a fiberoptic magnetometer as detailed in "Phase Shift Nulling DC-Field Fibreoptic Magnetometer" by A. D. Kersey, et al., in Electronic Letters Vol. 20 No. 14 (July 1984), or semi-conductor based magnetic field sensors and transistors as described in "Silicon Micro-Transducers," by S. Middelhoek and D. J. W. Noorlag in The Journal of Physics, E: Scientific Instruments, Vol. 14 (1981), or the permalloy based magnetoresistive sensors as described in "The Permalloy Magnetoresistive Sensors—Properties and Applications" by W. Kwiatowski and S. Tumanski, The Journal of Physics, E: Scientific Instruments, Vol. 19, No 7 (July 1986); or piezoelectrical crystal receivers such as would be depicted in a patent of R. Pittmann, Apparatus for measuring the strength and direction of magnetic fields utilizing a Piezoelectric Crystal (U.S. Pat. No. 3,564,402 Feb. 16, 1971). There are many variations of such D.C. sensors detailed in the open literature and there are many other methods that are well known to those skilled in the art. For the subject application where one desires to measure a transmitted magnetic field that is superimposed on top of the Earth's magnetic field, an arrangement such as taught in U.S. Pat No. 2,485,847 issued Oct. 25, 1949 allows one to cancel the Earth's field right at Receiver 3's antenna thus allowing one to make a more sensitive measure of the transmitted fields deviation from the Earth's field. The output from Receiver 3 goes to Signal Processing Electronics 4 because the abovesaid technologies are well known, no drawing of a Receiver 3 is herein submitted.

Figure 4:
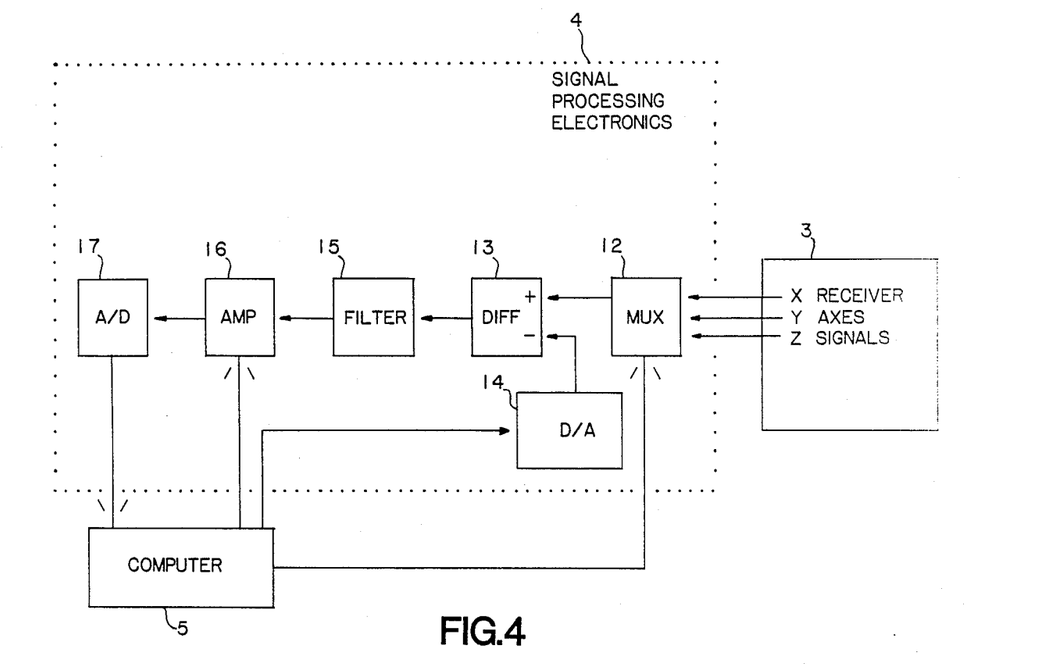
FIG. 4 is a block diagram of the receiver signal processing electronics that constitute an integral part of the disclosed invention.

As detailed in FIG. 4, the Signal Processing Electronics 4 consisting of Multiplexer (MUX) 12, which switches on, via command from Computer 5, the desired X, Y, or Z detected antenna signal, one at a time, to Differential Amplifier (DIFF) 13. Differential Amplifier 13 subtracts from this antenna signal the previously measured component of the Earth's magnetic field, outputting only that part of the received signal that is due to the transmitted field. This Earth's magnetic field component would have been stored in Computer 5 during a previous measurement cycle and sent to Differential Amplifier 13 via Digital to Analog Converter (D/A) 14. The output from Differential Amplifier 13 is then filtered by Filter 15 to remove noise and is amplified by Amplifier 16. Computer 5 sets the gain of Amplifier 16 to the maximum value possible such that Receiver 3's signal will not exceed the limits of Analog to Digital Converter (A/D) 17. The Analog to Digital Converter (A/D) 17 then converts the received DC signal to a digital format that can be read by Computer 5.

Figure 5:
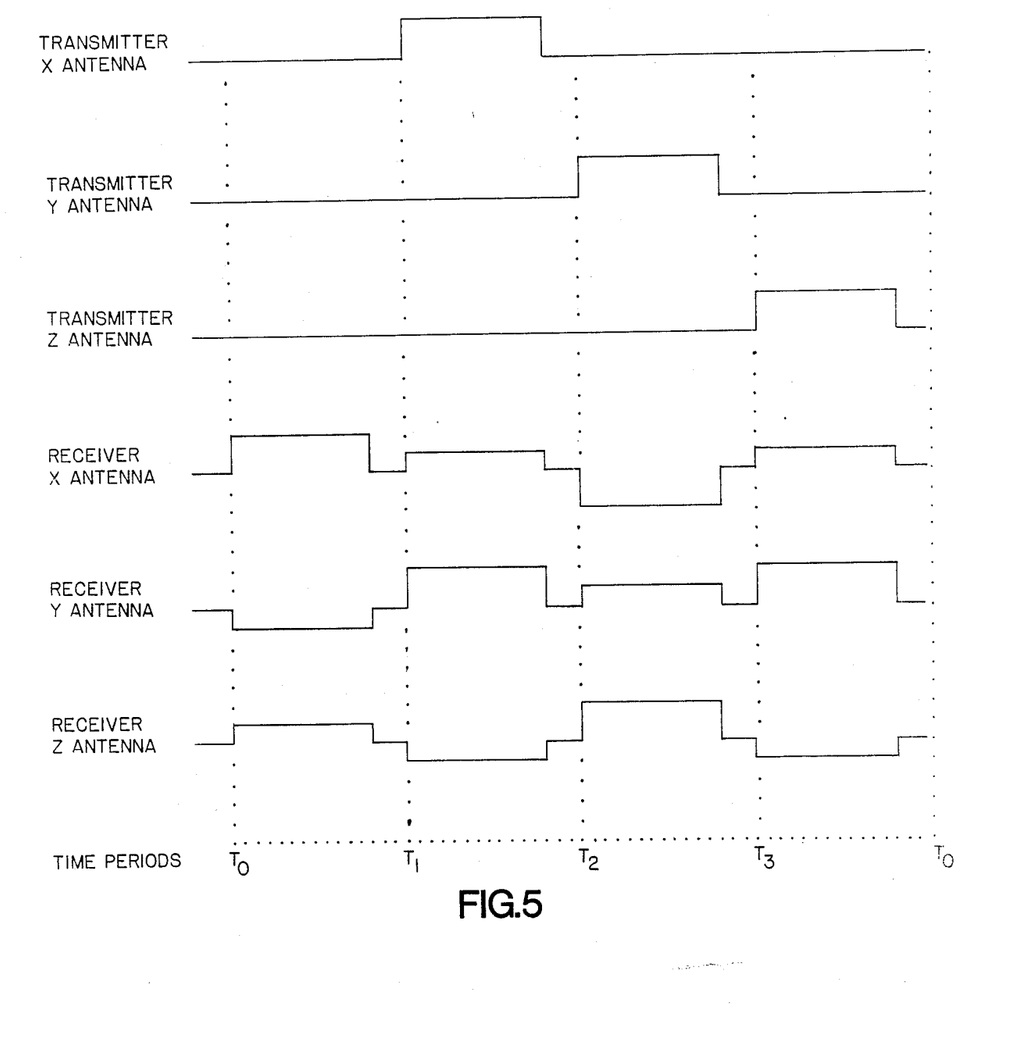
FIG. 5 is a timing diagram showing the relationship between the transmitted and receiving signals generated during any use of the disclosed invention.

FIG. 5 shows the timing relationship between the current pulses provided by Transmitter Driver 1 to Transmitter 2 and the signals received by Receiver 3. As shown therein, the transmitting and receiving sequence begins at time $T_0$ with all three Transmitter 2 antennae shut off. During the time period $T_0$ to $T_1$, the X, Y, and Z components of the Earth's magnetic field are measured by Receiver 3 and read into Computer 5. Computer 5 outputs these Earth field values to Signal Processing Electronics 4 where they are subtracted from the nine measured values generated when Transmitter 2's X, Y, and Z antennae are turned on. At time $T_1$ a current pulse is supplied only to the X Antenna of Transmitter 2. After the pulse reaches its steady state value, a DC magnetic field will be established about Transmitter 2's X antenna that is free of distortions due to eddy currents. As shown in FIG. 5, Receiver 3's X, Y, and Z antennae will measure the X, Y and Z components of this transmitted magnetic field plus the Earth's magnetic field during the period $T_1$ to $T_2$, the amplitude of the measured signals being a function of the position and orientation of Receiver 3's antennae with respect to Transmitter 2's X antenna and the location and orientation of Receiver 3 on the Earth's surface. During the $T_1$ to $T_2$ period, the Earth's field is subtracted from Receiver 3's X, Y, and Z signals and the resulting analog signals are conditioned and converted to a digital format by the Receiver Signal Processing Electronics 4 and read into Computer 5 and then the X antenna of Transmitter 2 is turned off. At time $T_2$, a current pulse is applied to Transmitter 2's Y antenna and again Receiver 3's X, Y, and Z antennae values are read into Computer 5 during the period $T_2$ to $T_3$. Starting at time $T_3$, the same process is repeated for Transmitter 2's Z antenna. At the end of this period, twelve receiver values will have been read into Computer 5; three Earth field components and three receiver values for each of the three transmitter antennae. The entire sequence of turning on Transmitter X, Y, and Z antenna then repeats itself as above, continuing as long as measurements are required.

Figure 6:
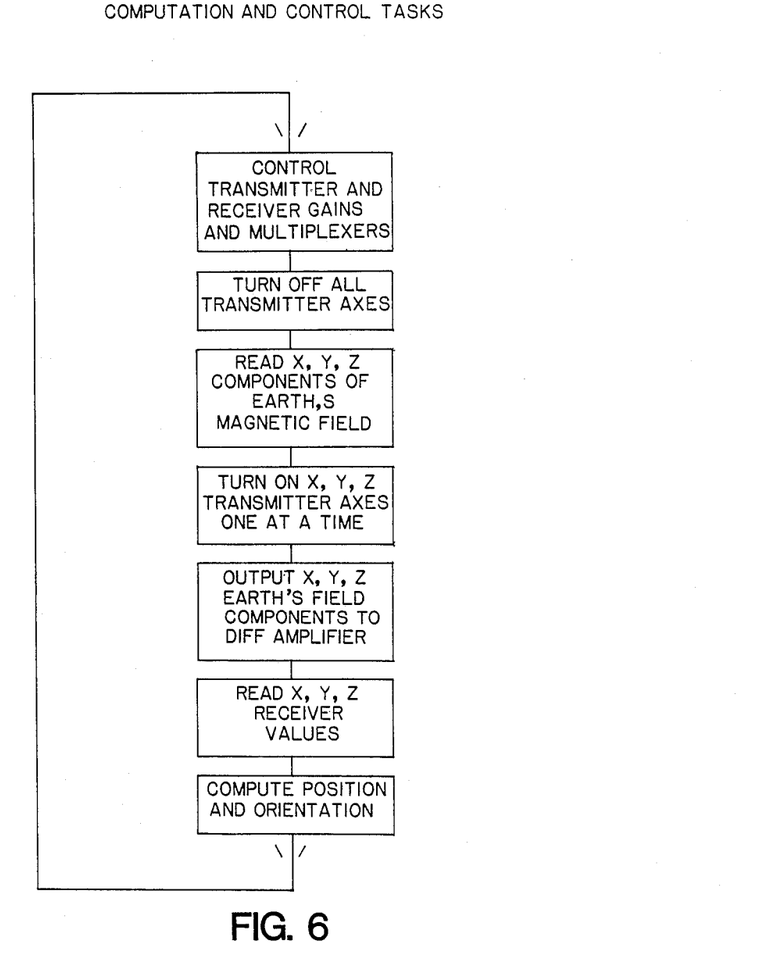
FIG 6 is a diagram of computational and control task sequences as performed by the computer component of this device.

FIG. 6 summarizes the computational and control task sequences performed by Computer 5 in controlling the hardware elements 7, 8, 12, 14, and 16 and in converting the received data into position and orientation outputs.

The twelve data items measured by the system can be represented by the following matrix:

$$M = \begin{vmatrix} M(1,1) & M(1,2) & M(1,3) & E(1,4) \\ M(2,1) & M(2,2) & M(2,3) & E(2,4) \\ M(3,1) & M(3,2) & M(3,3) & E(3,4) \end{vmatrix}$$

Where the elements in each row represent the values measured by the X, Y, and Z axes of Receiver 3 and the elements in the first three columns represent data measured by Receiver 3 minus the Earth's magnetic field when the X, Y, and Z axes of Transmitter 2 were turned on one at a time. Data elements in the fourth column represent the components of the Earth's magnetic field measured when the three Transmitter 2 axes were turned off. For example, M(2,1) represents the Y receiver axis value measured when the X transmitter axis were turned on minus the Y component of the Earth's magnetic field ( E(2,4) ).

Since the elements in the first three columns represent the signals one would measure from a Transmitter 2 if there was no Earth's magnetic field present, the position and orientation of the Receiver 3 with respect to Transmitter 2 can be extracted from these nine elements through the use of any one of the many algorithms known to those skilled in the art. For example, the algorithms detailed in U.S. Pat. No. 4,287,809 or U.S. Pat. No. 4,314,251 will produce the desired position and orientation information.

What is claimed is:

1. A device for quantitatively measuring the relative position and orientation of receiving antennae with respect to transmitting antennae serving to measure the relative position and orientation of two bodies in the presence of metals utilizing direct current magnetic fields, comprising:
   (a) Transmitting means for transmitting direct current magnetic fields;
   (b) Receiving means for receiving said transmitted direct current magnetic fields;
   (c) Means for supplying direct current electrical signals to said transmitting means for creating said transmitted direct current magnetic fields;
   (d) Receiver Electronics for measuring, and converting output signals from said receiving means into position and orientation measurements consisting of a programmed computer, an analog to digital converter, a programmable gain signal amplifier, a filter, a differential amplifier, a digital to analog converter and a multiplexer switching unit for receiving signals one at a time from the antennae of said receiving means which said multiplexer switching unit, under the control of said programmed computer, passes a selected one of said received signals to said differential amplifier where the Earth's magnetic field signal, which was measured by said receiver and read into said computer when the said transmitter was shut off, is outputted from said computer to said digital to analog converter where said digital to analog converter converts the digital representation of the Earth's magnetic field signal strength to an analog representation which goes to said differential amplifier, where the said Earth's field signal is subtracted from said selected received signal whereupon the output from said differential amplifier then goes to said filter for removing noise from the said selected received signal which then passes said filtered signal to said programmable gain signal amplifier, which, under the control of said programmed computer, increases said received filtered signal's level to a value appropriate to the signal level limits of said analog to digital converter which converts the said amplified received filtered signal to a digital representation that is then passed to said programmed computer.

2. A device for quantitatively measuring the relative position and orientation of receiving antennae with respect to transmitting antennae serving to measure the relative position and orientation of two bodies in the presence of metals utilizing direct current magnetic fields, comprising:
   (a) A transmitter for transmitting direct current magnetic fields consisting of a core and a multiplicity of roughly orthogonal antenna axis wire windings;
   (b) Receiving means for receiving said transmitted direct current magnetic fields;
   (c) Transmitter electronics consisting of a programmed computer, a digital-analog signal converter, a Multiplexer actuated by said programmed computer in receiver electronics and simultaneously by said converter and one direct current power source applied to the wire windings of each transmitter antenna axis to generate a magnetic field actuated in turn by said Multiplexer;
   (d) Receiver Electronics for measuring, and converting output signals from said receiving means into position and orientation measurements consisting of said programmed computer, an analog to digital converter, a programmable gain signal amplifier, a filter, a differential amplifier, a digital to analog converter and a multiplexer switching unit for receiving signals one at a time from the antennae of said receiving means which said multiplexer switching unit under the control of said programmed computer, passes a selected one of said received signals to said differential amplifier where the Earth's magnetic field signal, which was measured by said receiver and read into said computer when the said transmitter was shut off, is outputted from said computer to said digital to analog converter where said digital to analog converter converts the digital representation of the Earth's magnetic field signal strength to an analog representation which goes to said differential amplifier, where the said Earth's field signal is subtracted from said selected received signal whereupon the output from said differential amplifier then goes to said filter for removing noise from the said selected received signal which then passes said filtered signal to said programmable gain signal amplifier, which, under the control of said programmed computer, increases said filtered signal's level to a value appropriate to the signal level limits of said analog to digital converter which converts the said amplified received filtered signal to digital representation that is then passed to said programmed computer.

3. A device for quantitatively measuring the relative position and orientation of receiving antennae with respect to transmitting antennae serving to measure the relative position and orientation of two bodies in the presence of metals utilizing direct current magnetic fields, comprising:
   (a) A transmitter for transmitting direct current magnetic fields consisting of a core and a multiplicity of roughly orthogonal antenna axis wire windings;
   (b) Receiving means for receiving said transmitted direct current magnetic fields;
   (c) Means for supplying direct current electrical signals to said transmitting means for creating said transmitted direct current magnetic fields;
   (d) Receiver Electronics for measuring, and converting output signals from said receiving means into position and orientation measurements consisting of a programmed computer, an analog to digital converter, a programmable gain signal amplifier, a filter, a differential amplifier, a digital to analog converter and a multiplexer switching unit for receiving signals one at a time from the antennae of said receiving means which said multiplexer switching unit, under the control of said programmed computer, passes a selected one of said received signals to said differential amplifier where the Earth's magnetic field signal, which was measured by said receiver and read into said computer when the said transmitter was shut off, is outputted from said computer to said digital to analog converter where said digital to analog converter converts the digital representation of the Earth's magnetic field signal strength to an analog representation which goes to said differential amplifier, where the said Earth's magnetic field signal is subtracted from said selected received signal whereupon the output from said differential amplifier then goes to said filter for removing noise from the said selected received signal which then passes said filtered signal to said programmable gain signal amplifier, which, under the control of said programmed computer, increases said received filtered signal's level to a value appropriate to the signal level limits of said analog to digital converter which converts the said amplified received filtered signal to a digital representation that is then passed to said programmed computer.

4. A device for quantitatively measuring the relative position and orientation of receiving antennae with respect to transmitting antennae serving to measure the relative position and orientation of two bodies in the presence of metals utilizing direct current magnetic fields, comprising:

(a) Transmitting means for transmitting direct current magnetic fields;

(b) Receiving means for receiving said transmitted direct current magnetic fields consisting of a multiplicity of roughly orthogonal antennae axes that are sensitive to transmitted direct current magnetic fields;

(c) Means for supplying direct current electrical signals to said transmitting means for creating said transmitted direct current magnetic fields;

(d) Receiver Electronics for measuring, and converting output signals from said receiving means into position and orientation measurements consisting of a programmed computer, an analog to digital converter, a programmable gain signal amplifier, a filter, a differential amplifier, a digital to analog converter and a multiplexer switching unit for receiving signals one at a time from the antennae of said receiving means which said multiplexer switching unit, under the control of said programmed computer, passes a selected one of said receiving signals to said differential amplifier where the Earth's magnetic field signal, which was measured by said receiver and read into said computer when the said transmitter was shut off, is outputted from said computer to said digital to analog converter where said digital to analog converter converts the digital representation of the Earth's magnetic field signal strength to an analog representation which goes to said differential amplifier, where the said Earth's magnetic field signal is subtracted from said selected received signal whereupon the output from said differential amplifier then goes to said filter for removing noise from the said selected received signal which then passes said filtered signal to said programmable gain signal amplifier, which, under the control of said programmed computer, increases said received filtered signal's level to a value appropriate to the signal level limits of said analog to digital converter which converts the said amplified received filtered signal to a digital representation that is then passed to said programmed computer.

5. A device for quantitatively measuring the relative position and orientation of receiving antennae with respect to transmitting antennae serving to measure the relative position and orientation of two bodies in the presence of metals utilizing direct current magnetic fields, comprising:

(a) Transmitting means for transmitting direct current magnetic fields;

(b) Receiving means for receiving said transmitted direct current magnetic fields;

(c) Transmitter electronics consisting of a programmed computer, a digital-analog signal converter, a Multiplexer actuated by said programmed computer in receiver electronics and simultaneously by said converter and one direct current power source applied to the wire windings of each transmitter antenna axis to generate a magnetic field actuated in turn by said Multiplexer;

(d) Receiver Electronics for measuring and converting output signals from said receiving means into position and orientation measurements consisting of said programming computer, an analog to digital converter, a programmable gain signal amplifier, a filter, a differential amplifier, a digital to analog converter and a multiplexer switching unit for receiving signals one at a time from the antennae of said receiving means which said multiplexer switching unit, under the control of said programmed computer, passes a selected one of said received signals to said differential amplifier where the Earth's magnetic field signal, which was measured by said receiver and read into said computer when the said transmitter was shut off, is outputted from said computer to said digital to analog converter where said digital to analog converter converts the digital representation of the Earth's magnetic field signal strength to an analog representation which goes to said differential amplifier, where the said Earth's magnetic field signal is subtracted from said selected received signal whereupon the output from said differential amplifier then goes to said filter for removing noise from the said selected received signal which then passes said filtered signal to said programmable gain signal amplifier, which, under the control of said programmed computer, increases said received filtered signal's level to a value appropriate to the signal level limits of said analog to digital converter which converts the said amplified received filtered signal to a digital representation that is then passed to said programmed computer.

6. A device for quantitatively measuring the relative position and orientation of receiving antennae with respect to transmitting antennae serving to measure the relative position and orientation of two bodies in the presence of metals utilizing direct current magnetic fields, comprising:

(a) Transmitting means for transmitting direct current magnetic fields;

(b) Receiving means for receiving said transmitted direct current magnetic fields consisting of a multiplicity of roughly orthogonal antennae axes that are sensitive to transmitted direct current magnetic fields;

(c) Transmitter electronics consisting of a programmed computer, a digital-analog signal converter, a Multiplexer actuated by said programmed computer in receiver electronics and simultaneously by said converter and one direct current power source applied to the wire windings of each transmitter antenna axis to generate a magnetic field actuated in turn by said Multiplexer;

(d) Receiver Electronics for measuring and converting output signals from said receiving means into position and orientation measurements consisting of said programmed computer, an analog to digital converter, a programmable gain signal amplifier, a filter, a differential amplifier, a digital to analog converter and a multiplexer switching unit for receiving signals one at a time from the antenna of said receiving means which said multiplexer switching unit, under the control of said programmed computer, passes a selected one of said receiving signals to said differential amplifier where the Earth's magnetic field signal, which was measured by said receiver and read into said computer when the said transmitter was shut off, is outputted from said computer to said digital to analog converter where said digital to analog converter converts the digital representation of the Earth's magnetic field signal strength to an analog representation which goes to said differential amplifier, where the said Earth's magnetic field signal is subtracted from said selected received signal whereupon the output from said differential amplifier then goes to said filter for removing noise from the said selected received signal which then passes said filtered signal to said programmable gain signal amplifier, which, under the control of said programmed computer, increases said received filtered signal's level to a value appropriate to the signal level limits of said analog to digital converter which converts the said amplified received filtered signal to a digital representation that is then passed to said programmed computer 7. A device for quantitatively measuring the relative position and orientation of receiving antennae with respect to transmitting antennae serving to measure the relative position and orientation of two bodies in the presence of metals utilizing direct current magnetic fields, comprising:

(a) A transmitter for transmitting direct current magnetic fields consisting of a core and a multiplicity of roughly orthogonal antenna axis wire windings;

(b) Receiving means for receiving said transmitted direct current magnetic fields consisting of a multiplicity of roughly orthogonal antennae axes that are sensitive to transmitted direct current magnetic fields;

(c) Means for supplying direct current electrical signals to said transmitting means for creating said transmitted direct current magnetic fields;

(d) Receiver Electronics for measuring, and converting output signals from said receiving means into position and orientation measurements consisting of a programmed computer, an analog to digital converter, a programmable gain signal amplifier, a filter, a differential amplifier, a digital to analog converter and a multiplexer switching unit for receiving signals one at a time from the antennae of said receiving means which said multiplexer switching unit, under the control of said programmed computer, passes a selected one of said received signals to said differential amplifier where the Earth's magnetic field signal, which was measured by said receiver and read into said computer when the said transmitter was shut off, is outputted from said computer to said digital to analog converter where said digital analog converter converts the digital representation of the Earth's magnetic field signal strength to an analog representation which goes to said differential amplifier, where the said Earth's field signal is subtracted from said selected received signal whereupon the output from said differential amplifier then goes to said filter for removing noise from the said selected received signal which then passes said filtered signal to said programmable gain signal amplifier, which, under the control of said programmed computer, increases said received filtered signal's level to a value appropriate to the signal level limits of said analog to digital converter which converts the said amplified received filtered signal to a digital representation that is then passed to said programmed computer.

8. A device for quantitatively measuring the relative position and orientation of receiving antennae with respect to transmitting antennae serving to measure the relative position and orientation of two bodies in the presence of metals utilizing direct current magnetic fields, comprising:

(a) A transmitter for transmitting direct current magnetic fields consisting of a core and multiplicity of roughly orthogonal antenna axis wire windings;

(b) Receiving means for receiving said transmitted direct current magnetic fields consisting of a multiplicity of roughly orthogonal antennae axes that are sensitive to transmitted direct current magnetic fields;

(c) Transmitter electronics consisting of a programmed computer, a digital-analog signal converter, a Multiplexer actuated by said programmed computer in receiver electronics and simultaneously by said converter and one direct current power source applied to the wire windings of each transmitter antenna axis to generate a magnetic field actuated in turn by said Multiplexer;

(d) Receiver Electronics for measuring and converting output signals from said receiving means into position and orientation measurements consisting of said programmed computer, an analog to digital converter, a programmable gain signal amplifier, a filter, a differential amplifier, a digital to analog converter and a multiplexer switching unit for receiving signals one at a time from the antennae of said receiving means which said multiplexer switching unit, under the control of said programmed computer, passes a selected one of said received signals to said differential amplifier where the Earth's magnetic field signal, which was measured by said receiver and read into said computer when the said transmitter was shut off, is outputted from said computer to said digital to analog converter where said digital analog converter converts the digital representation of the Earth's magnetic field signal strength to an analog representation which goes to said differential amplifier, where the said Earth's field signal is subtracted from said selected received signal whereupon the output from said differential amplifier then goes to said filter for removing noise from the said selected received signal which then passes said filtered signal to said programmable gain signal amplifier, which, under the control of said programmed computer, increases said received filtered signal's level to a value appropriate to the signal level limits of said analog to digital converter which converts the said amplified received filtered signal to a digital representation that is then passed to said programmed computer.

9. A device for quantitatively measuring the relative position and orientation of receiving antennae with respect to transmitting antennae serving to measure the relative position and orientation of two bodies in the presence of metals utilizing direct current magnetic fields, comprising:
  (a) Transmitting means for transmitting direct current magnetic fields;
  (b) Receiving means for receiving said transmitted direct current magnetic fields;
  (c) Means for supplying direct current electrical signals to said transmitting means for creating said transmitted direct current magnetic fields;
  (d) Receiver electronics for controlling circuit elements of said transmitting and receiving means, measuring received signals and converting output signals from said receiving means into position and orientation measurements consisting of a programmed computer, an analog to digital converter, a programmable gain signal amplifier, a filter, a differential amplifier, a digital to analog converter and a multiplexer switching unit for receiving signals one at a time from the antennae of said receiving means which said multiplexer switching unit, under the control of said programmed computer, passes a selected one of said received signals to said differential amplifier where the Earth's magnetic field signal, which was measured by said receiver and read into said computer when the said transmitter was shut off, is outputted from said computer to said digital to analog converter where said digital to analog converter converts the digital representation of the Earth's magnetic field signal strength to an analog representation which goes to said differential amplifier, where the said Earth's field signal is subtracted from said selected received signal whereupon the output from said differential amplifier then goes to said filter for removing noise from the said selected received signal which then passes said filtered signal to said programmable gain signal amplifier, which, under the control of said programmed computer, increases said received filtered signal's level to a value appropriate to the signal level limits of said analog to digital converter which converts the said amplified received filtered signal to a digital representation that is then passed to said programmed computer.

10. A device for quantitatively measuring the relative position and orientation of receiving antennae with respect to transmitting antennae serving to measure the relative position and orientation of two bodies in the presence of metals utilizing direct current magnetic fields, comprising:
  (a) A transmitter for transmitting direct current magnetic fields consisting of a core and a multiplicity of roughly orthogonal antenna axis wire windings;
  (b) Receiving means for receiving said transmitted direct current magnetic fields;
  (c) Transmitter electronics consisting of a programmed computer, a digital-analog signal converter, a multiplexer actuated by said programmed computer in receiver electronics and simultaneously by said converter and one direct current power source applied to the wire windings of each transmitter antenna axis to generate a magnetic field actuated in turn by said multiplexer;
  (d) Receiver electronics for controlling circuit elements of said transmitter and said receiving means, measuring received signals and converting output signals from said receiving means into position and orientation measurements consisting of a programmed computer, an analog to digital converter, a programmable gain signal amplifier, a filter, a differential amplifier, a digital to analog converter and a multiplexer switching unit for receiving signals one at a time from the antennae of said receiving means which said multiplexer switching unit under the control of said programmed computer, passes a selected one of said received signals to said differential amplifier where the Earth's magnetic field signal, which was measured by said receiver and read into said computer when the said transmitter was shut off, is outputted from said computer to said digital to analog converter where said digital to analog converter converts the digital representation of the Earth's magnetic field signal strength to an analog representation which goes to said differential amplifier, where the said Earth's field signal is subtracted from said selected received signal whereupon the output from said differential amplifier then goes to said filter for removing noise from the said selected received signal which then passes said filtered signal to said programmable gain signal amplifier, which, under the control of said programmed computer, increases said received filtered signal's level to a value appropriate to the signal level limits of said analog to digital converter which converts the said amplified received filtered signal to digital representation that is then passed to said programmed computer.

11. A device for quantitatively measuring the relative position and orientation of receiving antennae with respect to transmitting antennae serving to measure the relative position and orientation to two bodies in the presence of metals utilizing direct current magnetic fields, comprising:
  (a) A transmitter for transmitting direct current magnetic fields consisting of a core of multiplicity of roughly orthogonal antenna axis wire windings;
  (b) A receiver for receiving said transmitted direct current magnetic fields consisting of a multiplicity of roughly orthogonal antennae axes that are sensitive to transmitted direct current magnetic fields;
  (c) Transmitter electronics consisting of a programmed computer, a digital to analog signal converter, a multiplexer actuated by said computer in receiver electronics and simultaneously by said converter and one direct current power source applied to the wire windings of each transmitter antenna axis to generate a magnetic field actuated in turn by said Multiplexer;
  (d) Receiver electronics for controlling circuit elements of said transmitter and said receiving means, measuring received signals and converting output signals from said receiving means into position and orientation measurements consisting of a programmed computer, an analog to digital converter, a programmable gain signal amplifier, a filter, a differential amplifier, a digital to analog converter and a multiplexer switching unit for receiving signals one at a time from the antennae of said receiving means which said multiplexer switching unit, under the control of said programmed computer, passes a selected one of said received signals to said differential amplifier, where the Earth's magnetic field signal, which was measured by said receiver and read into said computer when the said transmitter was shut off, outputted from said computer to said digital to analog converter where said digital to analog converter converts the digital representation of the Earth's magnetic field signal strength to an analog representation which goes to said differential amplifier, where the Earth's field signal is subtracted from said selected received signal whereupon the output from said differential amplifier then goes to said filter for removing noise from the said selected received signal which then passes said filtered signal to said programmable gain signal amplifier, which, under the control of said programmed computer, increases said received filtered signal's level to a value appropriate to the signal level limits of said analog to digital converter which converts the said amplified received filtered signal to a digital representation that is then passed to said programmed computer.

* * * * *